US012468447B2

(12) United States Patent
Cariello et al.

(10) Patent No.: US 12,468,447 B2
(45) Date of Patent: Nov. 11, 2025

(54) EFFICIENCY FOR CONSECUTIVE READ OPERATIONS

(71) Applicant: Micron Technology, Inc., Boise, ID (US)

(72) Inventors: Giuseppe Cariello, Boise, ID (US); Fulvio Rori, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 4 days.

(21) Appl. No.: 18/420,479

(22) Filed: Jan. 23, 2024

(65) Prior Publication Data

US 2024/0264745 A1 Aug. 8, 2024

Related U.S. Application Data

(60) Provisional application No. 63/483,395, filed on Feb. 6, 2023.

(51) Int. Cl.
*G06F 3/06* (2006.01)
(52) U.S. Cl.
CPC ......... *G06F 3/0611* (2013.01); *G06F 3/0659* (2013.01); *G06F 3/0679* (2013.01)

(58) Field of Classification Search
CPC .... G06F 3/0611; G06F 3/0659; G06F 3/0679; G11C 11/5642; G11C 16/0483; G11C 16/08; G11C 16/10; G11C 16/32; G11C 16/26
See application file for complete search history.

(56) References Cited

U.S. PATENT DOCUMENTS

| 10,734,077 B1* | 8/2020 | Kamae | G11C 16/32 |
| 2017/0125091 A1* | 5/2017 | Yoon | G11C 16/20 |
| 2019/0304555 A1* | 10/2019 | Lee | G11C 16/10 |
| 2023/0386561 A1* | 11/2023 | Ahn | G11C 16/26 |

* cited by examiner

*Primary Examiner* — Jason W Blust
(74) *Attorney, Agent, or Firm* — Holland & Hart LLP

(57) ABSTRACT

Methods, systems, and devices for improved efficiency for consecutive read operations are described. For example, a memory system may receive a first command indicating a first read operation in a block of memory cells that are each configured to store more than one bit. In response to receiving the first command, the memory system may initiate the performance of the first read operation by applying a voltage to a set of access lines associated with the block of memory cells. The memory system may additionally receive a second read command indicating a second, consecutive read operation in the block of memory cells, where the second command includes an indication to refrain from discharging the set of access lines. Here, the memory system may initiate the performance of the second read operation without first discharging the set of access lines after the performance of the first read operation.

18 Claims, 8 Drawing Sheets

EFFICIENCY FOR CONSECUTIVE READ OPERATIONS

CROSS REFERENCE

The present Application for Patent claims the benefit of U.S. Provisional Patent Application No. 63/483,395 by CARIELLO et al., entitled "IMPROVED EFFICIENCY FOR CONSECUTIVE READ OPERATIONS," filed Feb. 6, 2023, assigned to the assignee hereof, and expressly incorporated by reference in its entirety herein.

FIELD OF TECHNOLOGY

The following relates to one or more systems for memory, including improved efficiency for consecutive read operations.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

Figure 1:
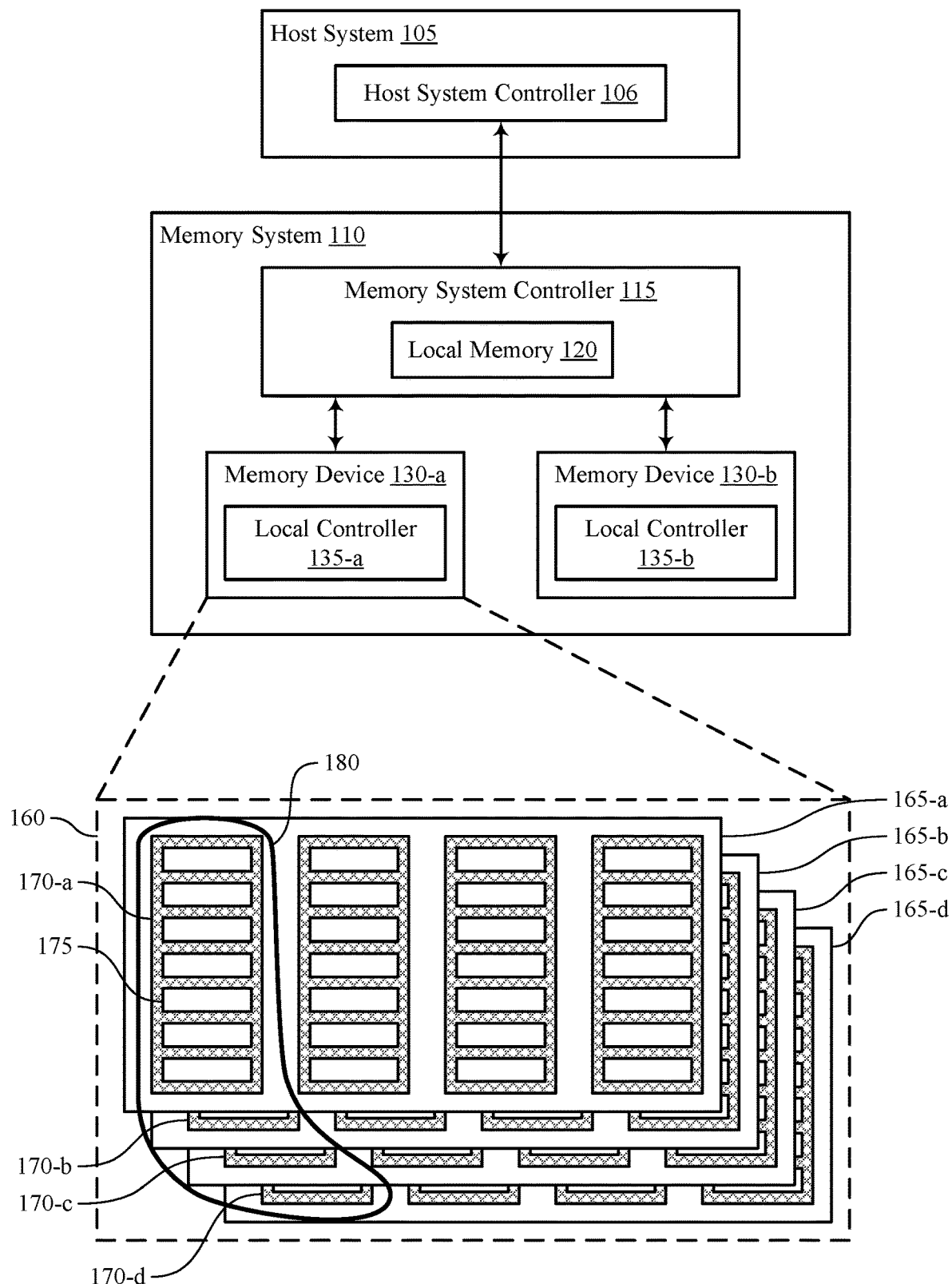
FIG. 1 illustrates an example of a system that supports improved efficiency for consecutive read operations in accordance with examples as disclosed herein.

A memory system may include memory cells configured to store more than one bit of information (e.g., MLCs (multi-level cells), TLCs (tri-level cells), quad-level cells (QLCs)). Additionally, the memory cells in the memory system may be divided into blocks, where each block includes a set of memory cells. To initiate a read operation on one or more memory cells in a block, the memory system may activate the block of memory cells by applying a voltage to a set of access lines (e.g., word lines) that are associated with the block of memory cells. After activating the block of memory cells, the memory system may perform a sensing operation on the one or more memory cells, and subsequently deactivate the block of memory cells by discharging the access lines to close the block of memory cells. The discharging of the access lines to close the block of memory cells may, in some examples, correspond to a recovery phase of the read operation. In some examples, the memory system may perform sequential read operations at the same block of memory cells. Here, the memory system may initiate the second read operation (e.g., by activating the block of memory cells) upon a completion of the recovery phase associated with the first, previous read operation. In some cases, the duration of time corresponding to the recovery phase of a first read operation followed by the subsequent activation of the block of memory cells (e.g., to initiate the second read operation) by the memory system may be associated with a latency related to sequential read operations on a same block of memory cells.

In accordance with examples as disclosed herein, a memory system may be configured to skip the recovery phase (e.g., refrain from discharging the access lines) between sequential read operations on a same block of memory cells. Additionally, the memory system may initiate the second read operation without first re-activating the block of memory cells as a result of skipping the recovery phase of the previous read operation. That is, the access lines associated with the block of memory cells may still be activated after the first read operation, thus enabling the memory system to perform the sensing operation associated with the second read operation without first activating the block of memory cells. In some cases, skipping a recovery phase of a first read operation and skipping an activation associated with a second read operation may decrease a latency associated with the sequential read operations at the block of memory cells, among other advantages.

The memory system may receive an indication to skip the recovery phase of a read operation (e.g., to refrain from discharging access lines associated with the block) within a read command. In one example, the indication may indicate for the memory system to refrain from discharging the access lines during a performance of a read operation indicated by a previously-received read command Additionally or alternatively, the indication may indicate for the memory system to refrain from discharging the access lines during a performance of the read operation indicated by the read command including the indication (e.g., a future read operation). In either case, the memory system may refrain from discharging one or more access lines of a block of memory cells between sequential read operations at the block, thus decreasing latency associated with the performance of the sequential read operations, among other advantages.

In addition to applicability in memory systems as described herein, techniques for improved efficiency related to consecutive read operations may be generally implemented to improve the performance of various electronic devices and systems (including artificial intelligence (AI) applications, augmented reality (AR) applications, virtual reality (VR) applications, and gaming) Some electronic device applications, including high-performance applications such as AI, AR, VR, and gaming, may be associated with relatively high processing requirements to satisfy user expectations. As such, increasing processing capabilities of the electronic devices by decreasing response times, improving power consumption, reducing complexity, increasing data throughput or access speeds, decreasing communication times, or increasing memory capacity or density, among other performance indicators, may improve user experience or appeal. Implementing the techniques described herein may improve the performance of electronic devices by facilitating more efficient consecutive read operations, which may decrease processing or latency times, improve response times, or otherwise improve user experience, among other benefits.

Figure 2:
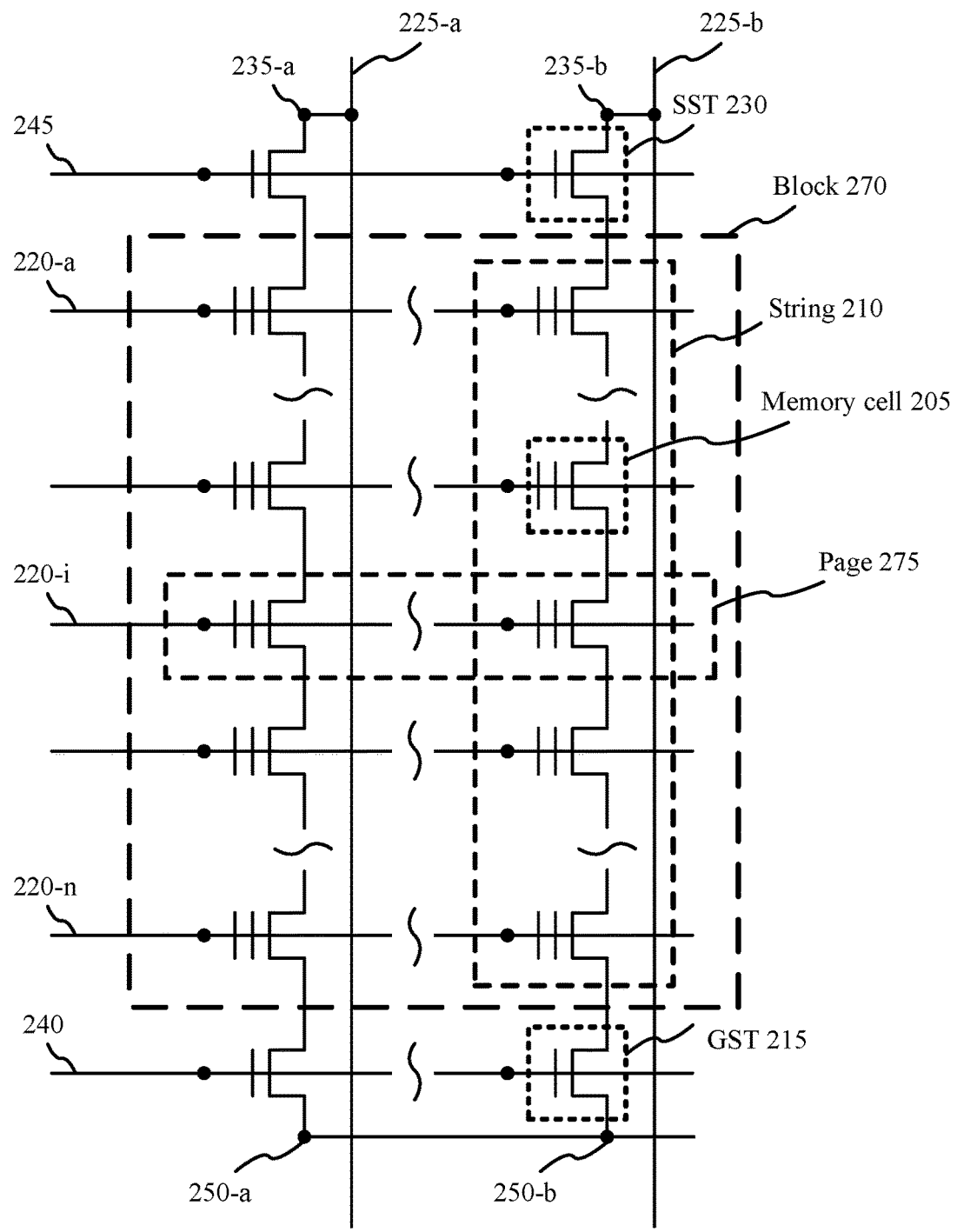
FIG. 2 illustrates an example of a memory circuit that supports improved efficiency for consecutive read operations in accordance with examples as disclosed herein.

Features of the disclosure are initially described in the context of a system and a memory circuit with reference to FIGS. 1 and 2. Features of the disclosure are described in the context of timing diagrams with reference to FIGS. 3 through 6. These and other features of the disclosure are further illustrated by and described in the context of an apparatus diagram and flowchart that relate to improved efficiency for consecutive read operations with reference to FIGS. 7 and 8.

FIG. 1 illustrates an example of a system 100 that supports improved efficiency for consecutive read operations in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within one or more of the memory devices 130.

The memory system controller 115 may include hardware such as one or more integrated circuits or discrete components, a buffer memory, or a combination thereof. The hardware may include circuitry with dedicated (e.g., hardcoded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as MLCs if configured to each store two bits of information, as TLCs if configured to each store three bits of information, as QLCs if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being hared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to initiate a read operation on one or more memory cells in a block 170 that includes multiple-level cells (e.g., MLCs, TLCs, QLCs), the memory system 110 may activate the entire block 170 by applying a voltage to a set of access lines (e.g., word lines, bit lines, digit lines, string select lines, source lines) that are associated with the block 170. After activating the block 170, the memory system 110 may perform a sensing operation on the one or more memory cells and subsequently deactivate the block 170 by discharging the access lines to close the block 170. The discharging of the access lines to close the block 170 may correspond to a recovery phase of the read operation. In some examples, the memory system 110 may perform sequential read operations at the same block 170. Here, the memory system 110 may initiate the second read operation (e.g., by activating the block 170) upon a completion of the recovery phase associated with the first, previous, read operation. In some cases, the duration of time corresponding to the recovery phase of a first read operation followed by the subsequent activation of the block 170 (e.g., to initiate the second read operation) by the memory system 110 may be associated with a latency associated with sequential read operations on a same block 170.

In the example of the system 100, the memory system 110 may skip the recovery phase (e.g., refrain from discharging the access lines) between sequential read operations on a same block 170. Additionally, the memory system 110 may initiate the second read operation without first re-activating the block 170 as a result of skipping the recovery phase of the previous read operation. That is, the access lines associated with the block 170 may still be activated after the first read operation, thus enabling the memory system 110 to perform the sensing operation associated with the second read operation without first activating the block 170. In some cases, skipping a recovery phase of a first read operation and skipping an activation associated with a second read operation may decrease a latency associated with the sequential read operations at the same block 170.

In some cases, the memory system 110 may receive an indication to skip the recovery phase of a read operation (e.g., to refrain from discharging access lines associated with the block) within a read command (e.g., received from the host system 105, generated by the memory system controller 115 or a local controller 135). In one example, the indication may indicate for the memory system 110 to refrain from discharging the access lines during a performance of a read operation indicated by a previously-received read command. Additionally or alternatively, the indication may indicate for the memory system 110 to refrain from discharging the access lines during a performance of the read operation indicated by the read command that includes the indication (e.g., a future read operation). In either case, the memory system 110 may refrain from discharging access lines of a block 170 between sequential read operations at the block 170, thus decreasing latency associated with the performance of the sequential read operations.

In some examples, one or more of the memory devices 130 themselves may skip the recovery phase (e.g., refrain from discharging the access lines) between sequential read operations, for example, sequential read operations on a same block 170. For example, one or more memory devices 130 (e.g., the local controllers 135) may determine that one or more memory devices 130 may refrain from discharging the access lines during a performance of a read operation indicated by one or more previously-received read commands Additionally or alternatively, one or more memory devices 130 may determine to refrain from discharging the access lines during a performance of the read operation indicated by the read command. As such, one or more of the memory devices 130 may skip the recovery phase of a read operation without receiving an indication, such as an explicit indication (e.g., from a host device), to do so.

The system 100 may include any quantity of non-transitory computer readable media that support improved efficiency for consecutive read operations. For example, the host system 105 (e.g., a host system controller 106), the memory system 110 (e.g., a memory system controller 115), or one or more memory devices 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or one or more memory devices 130 to perform associated functions as described herein.

FIG. 2 illustrates an example of a illustrates an example of a memory circuit 200 that supports improved efficiency for consecutive read operations in accordance with examples as disclosed herein. The memory circuit 200 may be an example of a portion of a memory device, such as a memory device 130. Although some elements included in FIG. 2 are labeled with reference numbers, some other corresponding elements are not labeled, though they are the same or would be understood to be similar, in an effort to increase visibility and clarity of the depicted features.

The memory circuit 200 includes multiple memory cells 205 connected in a NAND configuration. In a NAND memory configuration, multiple flash memory cells 205 may connected in series to form strings 210 of memory cells 205, in which a drain of each flash memory cell 205 in the string 210 may be coupled with a source of another flash memory cell 205 in the string. A string 210 may be a set of memory cells 205 that are each associated with (e.g., coupled with) a corresponding bit line 225 (which may also be referred to as digit lines). Each memory cell 205 in a string 210 may be associated with a separate word line 220 (e.g., one of word lines 220-*a*, 220-*i*, 220-*n*), such that the quantity of word lines 220 may be equal to the quantity of memory cells 205 in a string 210. A string 210 as shown in FIG. 2 may be an example of aspects of a memory cell stack.

A page 275 may be a set of memory cells 205 that are each associated with (e.g., coupled with) a corresponding word line 220. Thus a string 210 may include memory cells 205 from multiple different pages 255, and a page 275 may include memory cells 205 from multiple different strings 210. A page 275 as shown in FIG. 2 may be an example of aspects of a page 175 as described with reference to FIG. 1, for example. A block 270 may be a set of multiple pages 255 and thus may also include multiple strings 210. A block 270 as shown in FIG. 2 may be an example of aspects of a block 170 as described with reference to FIG. 1, for example.

In some cases, NAND memory cells 205 may be programmed (e.g., set to a logic 0 value) and read from at the page 275 level of granularity, but may not be erasable (e.g., reset to a logic 1 value) at the page level of granularity. For example, NAND memory may instead be erasable at a higher level of granularity, such as at the block 270 level of granularity. In some cases, a NAND memory cell 205 may be erased before it may be re-programmed. Different memory devices may have different read, write, or erase characteristics.

In some cases, each string 210 of memory cells 205 in the memory circuit 200 may be coupled with a respective string select transistor (SST) 230 at one end of the string 210 and a respective ground select transistor (GST) 225 at the other end of the string 210. The gate of each SST 230 may be coupled with a string select line 245, which may be common to all SST 230 for the block 270. The gate of each GST 215 may be coupled with a ground select line 240, which may be common to all GSTs 215 for the block 270. The source of each GST 215 for the block 270 may be coupled with a common source line 250. And the drain of each SST 230 may be coupled with a respective bit line 225, the respective bit line 225 specific to an individual string 210. An SST 230 may be used to selectively couple a corresponding string 210 of memory cells 205 to a bit line 225, based on applying a voltage to the string select line 245, and thus to the gate of SST 230. Similarly, a GST 215 may be used to selectively couple the corresponding string 210 of memory cells 205 to the source line 250, based on applying a voltage to ground select line 240, and thus to the gate of GST 215.

To operate the memory circuit 200 (e.g., to perform a program operation, a read operation, or an erase operation on one or more memory cells 205 of the block 270), various voltages may be applied to the string select line 245 (e.g., to the gate of the SSTs 230), to one or more bit lines 225 (e.g., to the drain 235 of one or more SSTs 230), to one or more word lines 220, to the ground select line 240 (e.g., to the gate of the GSTs 215), to the source line 250 (e.g., to the source of the GSTs 215), or to a bulk for the memory cells 205 (not shown) of the block 270. In some cases, each memory cell 205 of a block 270 may have a common bulk, the voltage of which may be controlled independently of bulks for other blocks 270.

In some cases, as part of a read operation for a memory cell 205, a positive voltage may be applied to the corresponding bit line 225, while source line 250 may be grounded or otherwise biased at a voltage lower than the voltage applied to the bit line 225. Concurrently, voltages may be applied to the string select line 245 and the ground select line 240 that are above the threshold voltages of the SST 230 and the GST 215 for the memory cell 205 respectively, thereby turning the SST 230 and GST 215 "ON," such that a channel associated with the string 210 that includes the memory cell 205 may be electrically connected to the corresponding bit line 225 and the source line 250. A channel may be an electrical path through the memory cells 205 in the string 210 (e.g., through the sources and drains of the transistors in the memory cells 205 of the string 210) that may conduct current under some operating conditions.

Concurrently, multiple word lines 220 (e.g., in some cases all word lines 220) of the block 270—except a selected word line 220 coupled with the memory cell 205 to be read)—may be set to a voltage (e.g., $V_{READ}$) that is higher than the threshold voltage ($V_T$) of the memory cells 205. $V_{READ}$ may cause all memory cells 205 in the unselected pages 255 (e.g., rows) to turn "ON" so that each unselected memory cell 205 in the string 210 may maintain high conductivity within the channel. In some instances, in response to receiving a command indicating the read operation, a memory system may activate the block 270 by applying a voltage to all the word lines 220 of the block 270. After the initial activation of the block 270, all the word lines 220 of the block 270—except the selected word line 220 coupled with the memory cell 205 to be read—may be set to the $V_{READ}$ voltage that is higher than the threshold voltage $V_T$ and the selected word line 220 may be set to another, lower voltage.

In some cases where the memory cells 205 are operated or configured as SLC memory cells, the word line 220 associated with the memory cell 205 to be read may be set to a voltage, $V_{Target}$. Here, $V_{Target}$ may be a voltage that is between (i) $V_T$ of a memory cell 205 in an erased state and (ii) $V_T$ of a memory cell 205 in a programmed state. In cases that the memory cell 205 to be read exhibits an erased $V_T$ (e.g., $V_{Target}>V_T$ of the memory cell 205), the memory cell 205 may turn "ON" in response to the application of $V_{Target}$ to the selected word line 220, which may allow a current to flow in the channel of the string 210, and thus from the bit line 225 to the source line 250. In cases that the memory cell 205 to be read exhibits a programmed $V_T$ (e.g., $V_{Target}<V_T$ of the selected memory cell), the memory cell 205 may remain "OFF," despite the application of $V_{Target}$ to the selected word line 220, and thus may prevent a current from flowing in the channel of the string 210, and thus from the bit line 225 to the source line 250.

In another case where the memory cells 205 are operated or configured as multiple-level memory cells, the word line 220 associated with the memory cell 205 to be read may be set to one or more voltages (e.g., $V_{Target1}$, $V_{Target2}$, $V_{TargetN}$). For example, in a case where the memory cells 205 are configured as MLCs (e.g., configured to store two bits of information), the word line 220 associated with the memory cell 205 to be read may be set to up to three different voltages: $V_{Target1}$, $V_{Target2}$, and $V_{Target3}$. Here, $V_{Target1}$ may be a voltage that is between (i) $V_T$ of a memory cell 205 storing a first logic state (e.g., corresponding to a logic value 00) and (ii) $V_T$ of a memory cell 205 storing a second logic state (e.g., corresponding to a logic value 01); $V_{Target2}$ may be a voltage that is between (ii) $V_T$ of a memory cell 205 storing the second logic state and (iii) $V_T$ of a memory cell 205 storing a third logic state (e.g., corresponding to a logic value 10); and $V_{Target3}$ may be a voltage that is between (iii) $V_T$ of a memory cell 205 storing the third logic state and (iv) $V_T$ of a memory cell 205 storing a fourth logic state (e.g., corresponding to a logic value 11).

In this example, in cases that the memory cell 205 to be read exhibits the first logic state (e.g., $V_{Target1}>V_T$ of the memory cell 205), the memory cell 205 may turn "ON" in response to the application of $V_{Target1}$ to the selected word line 220, which may allow a current to flow in the channel of the string 210, and thus from the bit line 225 to the source line 250. Additionally, or alternatively, in cases that the memory cell 205 to be read exhibits the second, third, or fourth logic states (e.g., $V_{Target1}<V_T$ of the memory cell 205), the memory cell may remain "OFF," despite the application of $V_{Target1}$ to the selected word line 220, and thus may prevent current from flowing in the channel of the string 210, and thus from the bit line 225 to the source line 250. In cases that $V_{Target1} < V_T$ of the memory cell 205, one or more additional voltages may be applied to the selected word line 220 to determine the logic state of the memory cell 205 to be read.

A signal on the bit line 225 for the memory cell 205 (e.g., an amount of current below or above a threshold) may be sensed (e.g., by a sense component), and may indicate whether the memory cell 205 became conductive or remained non-conductive in response to the application of $V_{Target}$ to the selected word line 220. In the case of an SLC, the sensed signal thus may be indicative of whether the memory cell 205 was in an erased state (e.g., storing a logic 1) or a programmed state (e.g., storing a logic 0). Additionally, in the case of a multiple-level cell, the sensed signal thus may be indicative of one of a plurality of logic states that is being stored by the memory cell 205. In some cases, a single read operation may read one page 275 of memory cells 205, as the memory cells 205 of the page 275 may all share a common word line 220, based on respective signals associated with the respective bit lines 225 for the memory cells 205 of the selected page 275.

After sensing the signal on the bit line 225 for the memory cell 205, the word lines 220 associated with the block 270 may be discharged. For example, the word lines 220 may be set to a relatively low voltage (e.g., ground). In some cases, this may correspond to a recovery phase of the read operation and deactivating the block 270.

In some examples, the memory circuit 200 may perform sequential read operations at the same block 270. Here, the memory circuit 200 may initiate the second read operation (e.g., by applying a voltage to the word lines 220 of the block 270 to activate the block 270) upon a completion of the recovery phase associated with the previous read operation. In some cases, the duration of time corresponding to the recovery phase of a first read operation followed by the subsequent activation of the block 270 (e.g., to initiate the subsequent read operation) by the memory circuit 200 may result in latency associated with sequential read operations on a same block 270.

In the example of the memory circuit 200, the memory circuit 200 may skip the recovery phase (e.g., refrain from discharging the word lines 220) between sequential read operations on a same block 270. Additionally, the memory circuit 200 may initiate the sequential read operation without first re-activating the block 270. That is, the word lines 220 of the block 270 may still be activated (e.g., may still be set to the voltage $V_{READ}$ that is higher than the threshold voltage $V_T$ of the memory cells 205) after the first read operation, thus enabling the memory circuit 200 to perform the sensing operation associated with the subsequent read operation without first activating the block 270. In some cases, skipping a recovery phase of a first read operation and skipping an activation associated with a second read operation may decrease a latency associated with the sequential read operations at the block 270.

A memory system may receive an indication to skip the recovery phase of a read operation (e.g., to refrain from discharging word lines 220 of the block 270) within a read command. In one example, the indication may indicate for the memory system to refrain from discharging the access lines (e.g., word lines 220, bit lines 225, digit lines, string select lines 245, source lines 250) during a performance of a read operation indicated by a previously-received read command. Additionally or alternatively, the indication may indicate for the memory system to refrain from discharging the word lines 220 during a performance of the read operation indicated by the read command including the indication (e.g., a future read operation). In either case, the memory system may refrain from discharging the word lines 220 of the block 270 between sequential read operations at the block 270, thus decreasing latency associated with the sequential read operations.

Figure 3:
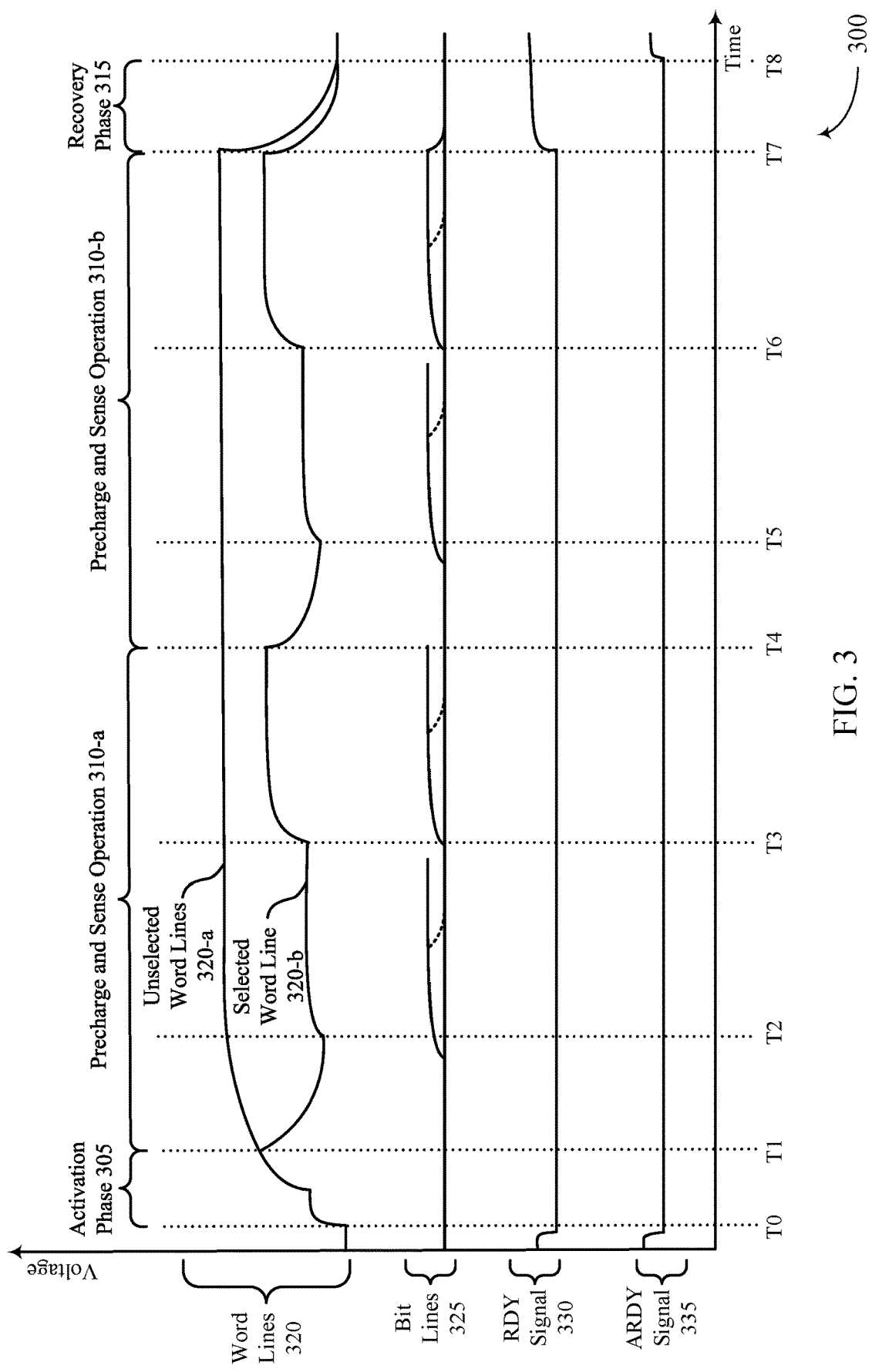
FIGS. 3 through 6 illustrate examples of timing diagrams that support improved efficiency for consecutive read operations in accordance with examples as disclosed herein.

FIG. 3 illustrates an example of a timing diagram 300 that supports improved efficiency for consecutive read operations in accordance with examples as disclosed herein. The timing diagram 300 may illustrate various voltages and signals applied and output by a memory system during consecutive read operations at a same block of memory cells and on a same word line 320-b as described herein, where the memory system refrains from discharging the word lines 320 associated with the block of memory cells between the consecutive read operations. For example, the timing diagram 300 may illustrate the voltages across word lines 320 and bit lines 325 during a read operation, which may be examples of word lines and bit lines as described with reference to FIGS. 1 and 2. Additionally, the timing diagram 300 may illustrate the voltages of a logic unity ready (e.g., RDY) signal 330 and an array ready (e.g., ARDY) signal 335.

Prior to the time T0, one or more memory devices of the memory system may receive a command (e.g., a read command) indicating a read operation in a block of multiple-level memory cells. For example, a host system may transmit a command to the memory system indicating for the memory system to execute the read first operation in the block. In some other examples, the memory system may generate the command (e.g., via a memory system controller) and provide the command to one or more memory devices at the memory system that includes the block of multiple-level memory cells.

At time T0 and in response to receiving the command indicating the first read operation at the block, the memory system may initiate the performance of the first read operation by applying a voltage to the word lines 320 associated with the block. In some cases, ramping up the voltages of the word lines 320 may activate the block of multiple-level memory cells. Thus, from time T0 to time T1, the memory system may execute an activation phase 305 of the first read operation, where the voltages of the word lines 320 in the block are increased from a relatively low voltage (e.g., a ground voltage) to a higher voltage.

Additionally, in response to receiving the command indicating the first read operation at the block, the memory system may adjust a RDY signal 330 associated with the block of multiple-level memory cells from a first voltage level (e.g., indicating that the memory system may initiate an access operation at the block of multiple-level memory cells) to a second voltage level (e.g., indicating that the block of multiple-level memory cells is busy and the memory system may be unable to initiate access operations at the block). Additionally, or alternatively, the memory system may adjust an ARDY signal 335 in response to receiving the command indicating the first read operation at the block. For example, the memory system may adjust the ARDY signal 335 for the array (e.g., the plane) that includes the block of multiple-level memory cells associated with the first read operation. Here, the memory system may adjust the ARDY signal 335 from a first voltage level (e.g., indicating that the memory system may initiate an access operation at the array) to a second voltage level (e.g., indicating that the array is busy, and the memory system may be unable to initiate access operations at the array).

At time T1 and after increasing the voltages of the word lines 220 associated with the block during the activation phase 305 of the first read operation, the memory system may begin an execution of a precharge and sense operation 310-a associated with the first read operation. Here, the memory system may apply the relatively high voltage to the unselected word lines 320-a (e.g., all the word lines 320 in the block except the word line 320-b associated with the one or more memory cells to be read during the first read operation). For example, the memory system may apply a $V_{READ}$ voltage to the unselected word lines 320-a, which may increase the voltage of the unselected word lines 320-a to a voltage level that is greater than the threshold voltages $V_T$ of the one or more memory cells to be read. Additionally, the memory system may apply a relatively lower voltage to select the word line 320-b.

At time T2, the memory system may apply a first target voltage (e.g., a $V_{Target1}$) to the selected word line 320-b. In cases that the threshold voltage $V_T$ of a memory cell being read is less than the voltage applied to the selected word line 320-b, the voltage on the bit line 325 coupled with the memory cell may increase (e.g., due to the memory cell turning "ON" and conducting current). Alternatively in cases that the threshold voltage $V_T$ of the memory cell being read is greater than the voltage applied to the selected word line 320-b, the voltage on the bit line 325 coupled with the memory cell may not change (e.g., due to the memory cell remaining "OFF" and not conducting current).

At time T3, the memory system may increase the voltage applied to the selected word line 320-b from the first voltage (e.g., the $V_{Target1}$) to a second, greater voltage (e.g., a $V_{Target2}$). Based on the voltages applied to the selected word line 320-b and the resulting voltages detected on the bit lines 325 coupled with the one or more memory cells to be read, the memory system may detect the values of the more than one bits stored by the one or memory cells read during the precharge and sense operation 310-a.

Prior to time T4, one or more memory devices of the memory system may the memory system may receive a second command (e.g., a read command) indicating a second, consecutive read operation in the block of multiple-level memory cells. For example, a host system may transmit the second command to the memory system indicating for the memory system to execute the first read operation in the block. In some other examples, the memory system may generate the second command (e.g., via a memory system controller) and provide the second command to one or more memory devices at the memory system that includes the block of multiple-level memory cells. In some cases, the second command may indicate for the second read operation to be performed on the same word line 320-b.

Additionally, prior to time T4, the memory system may determine to refrain from executing a recovery phase 315 of the first read operation after the precharge and sense operation 310-a. In one example, the command that indicates the first read operation may include an indication to refrain from discharging access lines associated with the block (e.g., the word lines 320) as part of the first read operation. Additionally, or alternatively, the command that indicates the second read operation may include an indication to refrain from discharging access lines associated with the block (e.g., the word lines 320) as part of the first read operation. In either case, at time T4, the memory system may complete an execution of the first read command (e.g., including the activation phase 305 and the precharge and sense operation 310-a) without discharging the word lines 320 to a relatively low voltage (e.g., a ground voltage).

At time T4 and in response to receiving the second command indicating the second read operation at the same block and same word line 320-b, the memory system may begin an execution of a precharge and sense operation 310-b associated with the second read operation. Here, the memory system may maintain the relatively high voltage of the unselected word lines 320-a (e.g., all the word lines 320 in the block except the selected word line 320-b). Additionally, the memory system may apply a relatively lower voltage to select the word line 320-b.

At time T5, the memory system may apply a first target voltage (e.g., a $V_{Target1}$) to the selected word line 320-b. Additionally, at time T6 the memory system may increase the voltage applied to the selected word line 320-b from the first voltage (e.g., the $V_{Target1}$) to a second, greater voltage (e.g., a $V_{Target2}$). Based on the voltages applied to the selected word line 320-b and the resulting voltages detected on the bit lines 325 coupled with the one or more memory cells to be read, the memory system may detect the values of the more than one bits stored by the one or memory cells read during the precharge and sense operation 310-b.

At time T7 and after completing the precharge and sense operation 310-b associated with the second read operation, the memory system may execute a recovery phase 315 of the second read operation. During the recovery phase 315 of the second read operation, the memory system may decrease the voltage of the word lines 320 of the block from a relatively high voltage to a relatively low voltage (e.g., a ground voltage). In some cases, decreasing the voltages of the word lines 320 of the block may deactivate the block of multiple-level memory cells. Additionally, at time T7 and in response to completing the precharge and sense operation 310-b of the second read operation, the memory system may adjust the RDY signal 330 from the second voltage level to the first voltage level.

At time T8, the memory system may complete the performance of the second read operation. Additionally, at time T8 the memory system may adjust the ARDY signal 335 from the second voltage level to the first voltage level (e.g., in response to discharging the word lines 320 to a ground voltage level).

Thus, the memory system may execute consecutive read operations on a same word line 320-b within a same block of multiple-level memory cells without discharging the word lines 320 between the first and second read operations. That is, the memory system completes the execution of the first read operation at time T4 and, without executing a recovery phase 315 as part of the first read operation and without executing a second activation phase 305 as part of the second read operation, the memory system initiates the performance of the second read operation. Additionally, the memory system may not unselect and reselect the word line 320-b associated with the first read operation. Here, the memory system may decrease a latency associated with the consecutive read operation by a duration that is approximately equivalent to a summation of the duration of an activation phase 305, a duration of a recovery phase 315, and a duration associated with deselecting and reselecting the word line 320-b.

Figure 4:
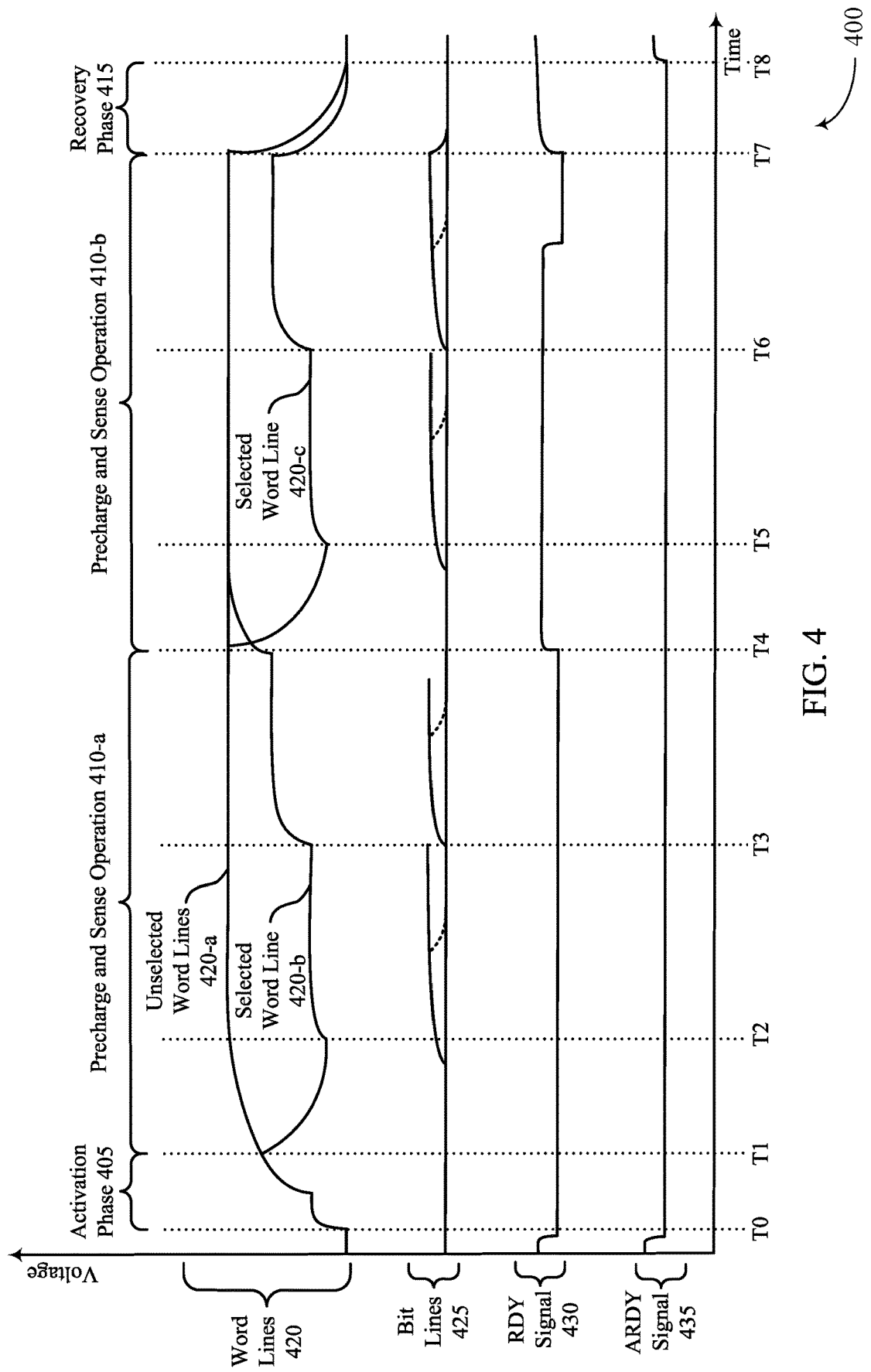

FIG. 4 illustrates an example of a timing diagram 400 that supports improved efficiency for consecutive read operations in accordance with examples as disclosed herein. The timing diagram 400 may illustrate various voltages and signals applied and output by a memory system during consecutive read operations at a same block of memory cells and on different word lines 420 as described herein, where the memory system refrains from discharging the word lines 420 associated with the block of memory cells between the consecutive read operations. For example, the timing diagram 400 may illustrate the voltages across word lines 420 and bit lines 425 during a read operation, which may be examples of word lines and bit lines as described with reference to FIGS. 1 through 3. Additionally, the timing diagram 400 may illustrate the voltages of a logic unity ready (e.g., RDY) signal 430 and an array ready (e.g., ARDY) signal 435.

Prior to the time T0, one or more memory devices of the memory system may receive a command (e.g., a read command) indicating a first read operation in a block of multiple-level memory cells. At time T0 and in response to receiving the command indicating the first read operation at the block, the memory system may initiate the performance of the first read operation by applying a voltage to the word lines 420 associated with the block. In some cases, ramping up the voltages of the word lines 420 may activate the block of multiple-level memory cells. Thus, from time T0 to time T1, the memory system may execute an activation phase 405 of the first read operation, where the voltages of the word lines 420 in the block are increased from a relatively low voltage (e.g., a ground voltage) to a higher voltage.

Additionally, in response to receiving the command indicating the first read operation at the block, the memory system may adjust a RDY signal 430 associated with the block of multiple-level memory cells from a first voltage level (e.g., indicating that the memory system may initiate an access operation at the block of multiple-level memory cells) to a second voltage level (e.g., indicating that the block of multiple-level memory cells is busy and the memory system may be unable to initiate access operations at the block). Additionally, or alternatively, the memory system may adjust an ARDY signal 435 in response to receiving the command indicating the first read operation at the block. For example, the memory system may adjust the ARDY signal 435 for the array (e.g., the plane) that includes the block of multiple-level memory cells associated with the first read operation. Here, the memory system may adjust the ARDY signal 435 from a first voltage level (e.g., indicating that the memory system may initiate an access operation at the array) to a second voltage level (e.g., indicating that the array is busy, and the memory system may be unable to initiate access operations at the array).

At time T1 and after increasing the voltages of the word lines 220 associated with the block during the activation phase 405 of the first read operation, the memory system may begin an execution of a precharge and sense operation 410-a associated with the first read operation. Here, the memory system may apply the relatively high voltage to the unselected word lines 420-a (e.g., all the word lines 420 in the block except the word line 420-b associated with the one or more memory cells to be read during the first read operation). Additionally, the memory system may apply a relatively lower voltage to select the word line 420-b (e.g., lower than the voltage applied to the unselected word lines 420-a, but higher than a ground voltage).

At time T2, the memory system may apply a first target voltage (e.g., a $V_{Target1}$) to the selected word line 420-b. At time T3, the memory system may increase the voltage applied to the selected word line 420-b from the first voltage (e.g., the $V_{Target1}$) to a second, greater voltage (e.g., a $V_{Target2}$). Based on the voltages applied to the selected word line 420-b and the resulting voltages detected on the bit lines 425 coupled with the one or more memory cells to be read, the memory system may detect the values of the more than one bits stored by the one or memory cells read during the precharge and sense operation 410-a.

Prior to time T4, one or more memory devices may receive a second command (e.g., a read command) indicating a second, consecutive read operation in the block of multiple-level memory cells. In some cases, the second command may indicate for the second read operation to be performed on a different word line 420-c. Additionally, prior to time T4, the memory system may determine to refrain from executing a recovery phase 415 of the first read operation (e.g., after executing the precharge and sense operation 410-a). In one example, the command that indicates the first read operation may include the indication to refrain from discharging access lines associated with the block (e.g., the word lines 420) as part of the first read operation. Additionally, or alternatively, the command that indicates the second read operation may include an indication to refrain from discharging access lines associated with the block (e.g., the word lines 420) as part of the first read operation. In either case, at time T4, the memory system may complete an execution of the first read command (e.g., including the activation phase 405 and the precharge and sense operation 410-a) without discharging the word lines 420 to a relatively low voltage (e.g., a ground voltage).

At time T4 and in response to the RDY signal 430 correlating to the first voltage level (e.g., indicating that the memory system may initiate an access operation at the block of multiple-level memory cells) and receiving the second command indicating the second read operation at the same block and the different word line 420-c, the memory system may begin an execution of a precharge and sense operation 410-b associated with the second read operation. Here, the memory system may apply the relatively high voltage to the previously-selected word line 420-b to increase the voltage of the word line 420-b to the voltage level of the unselected word lines 420-a. Additionally, the memory system may apply a relatively lower voltage to select the word line 420-c.

At time T5, the memory system may apply a first target voltage (e.g., a $V_{Target1}$) to the selected word line 420-c. Additionally, at time T6 the memory system may increase the voltage applied to the selected word line 420-c from the first voltage (e.g., the $V_{Target1}$) to a second, greater voltage (e.g., a $V_{Target2}$). Based on the voltages applied to the selected word line 420-c and the resulting voltages detected on the bit lines 425 coupled with the one or more memory cells to be read, the memory system may detect the values of the more than one bits stored by the one or memory cells read during the precharge and sense operation 410-b.

At time T7 and after completing the precharge and sense operation 410-b associated with the second read operation, the memory system may execute a recovery phase 415 of the second read operation. During the recovery phase 415 of the second read operation, the memory system may decrease the voltage of the word lines 420 of the block from a relatively high voltage to a relatively low voltage (e.g., a ground voltage). In some cases, decreasing the voltages of the word lines 420 of the block may deactivate the block of multiple-level memory cells. Additionally, at time T7 and in response to completing the precharge and sense operation 410-b of the second read operation, the memory system may adjust the RDY signal 430 from the second voltage level to the first voltage level.

At time T8, the memory system may complete the performance of the second read operation. Additionally, at time T8 the memory system may adjust the ARDY signal 435 from the second voltage level to the first voltage level (e.g., in response to discharging the word lines 420 to a ground voltage level).

Thus, the memory system may execute consecutive read operations on a same word line 420-*b* within a same block of multiple-level memory cells without discharging the word lines 420 between the first and second read operations. That is, the memory system completes the execution of the first read operation at time T4 and, without executing a recovery phase 415 as part of the first read operation and without executing a second activation phase 405 as part of the second read operation, the memory system initiates the performance of the second read operation. Here, the memory system may decrease a latency associated with the consecutive read operation by a duration that is approximately equivalent to a summation of the duration of an activation phase 405 and a duration of a recovery phase 415.

Figure 5:
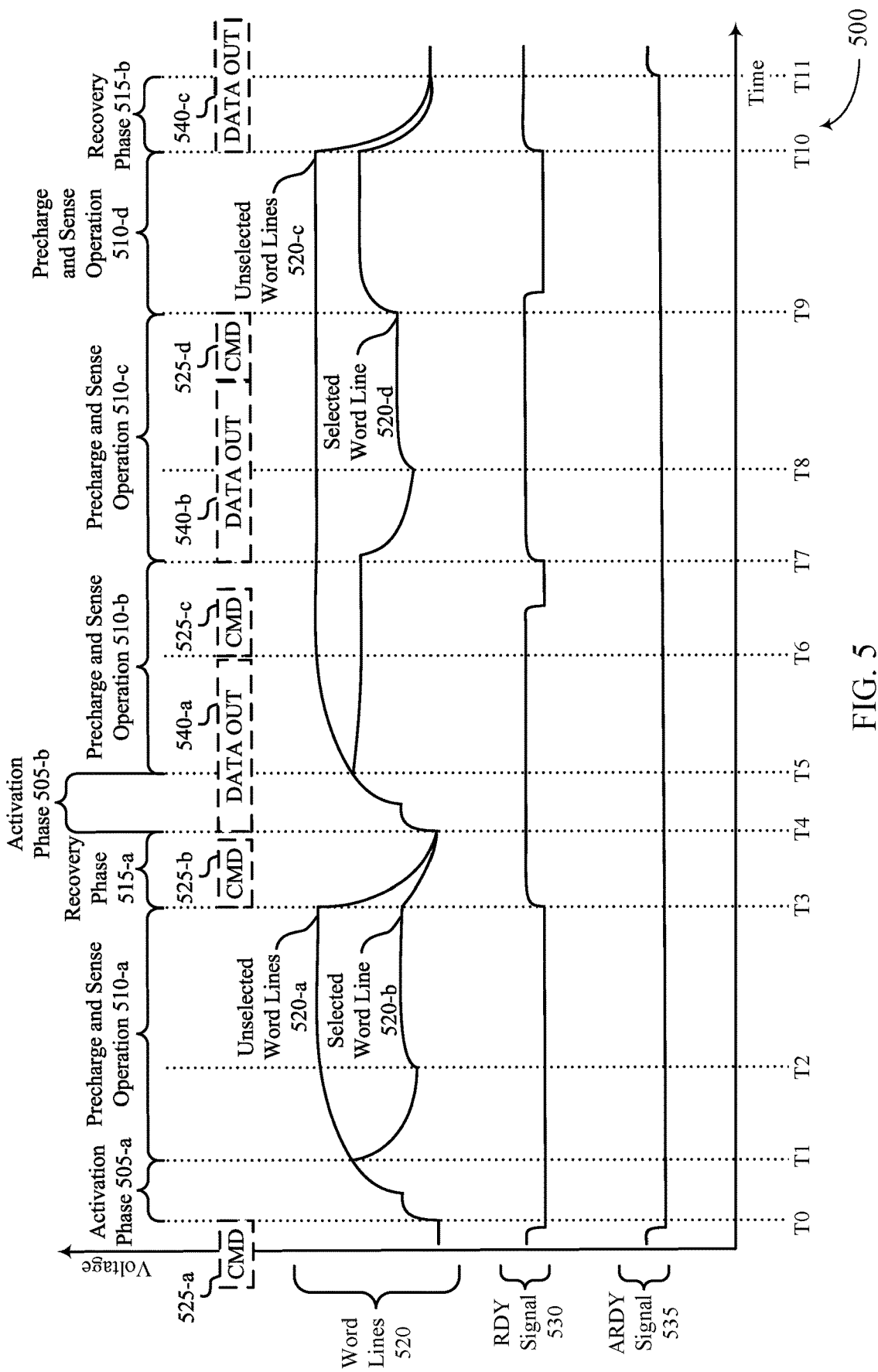

FIG. 5 illustrates an example of a timing diagram 500 that supports improved efficiency for consecutive read operations in accordance with examples as disclosed herein. The timing diagram 500 may illustrate the voltages across word lines 520 during a read operation, which may be examples of word lines and bit lines as described with reference to FIGS. 1 through 4. Additionally, the timing diagram 500 may illustrate the voltages of a logic unit ready (e.g., RDY) signal 530, the voltages of an array ready (e.g., ARDY) signal 535, selected word lines 520-*b* and 520-*d*, and unselected word lines 520-*a* and 520-*c*, which may be examples of the block ready signals, the array ready signals, the selected word lines, and the unselected word lines described with reference to FIGS. 3 and 4.

The timing diagram 500 may illustrate the various voltages and signals applied and output by a memory system during four consecutive read operations at a same block of memory cells as described herein. For example, the memory system may perform a first read operation from time T0 to time T4, a second read operation from time T4 to time T7, a third read operation from time T7 to time T9, and a fourth read operation from time T9 to time T11. The timing diagram 500 also includes an illustration of the four commands 525 indicating the first, second, third, and fourth read operations at the block of multiple-level memory cells. For example, the memory system may receive the command 525-*a* indicating the first read operation prior to time T0, the memory system may receive the command 525-*b* indicating the second read operation prior to time T4, the memory system may receive the command 525-*c* indicating the third read operation prior to time T7, and the memory system may receive the command 545-*d* indicating the fourth read operation prior to time T9.

In the example of the timing diagram 500, the commands 525-*b*, 525-*c*, and 525-*d* may each indicate consecutive or sequential read operations in the same block of multiple-level memory cells as the first command 525-*a*. Additionally, the commands 525-*b*, 525-*c*, and 525-*d* may each indicate for the memory system to refrain from discharging the word lines 520 during the performance of a preceding read operation (e.g., the read operation initiated immediately prior to the read operation indicated by the command 525). For example, the commands 525-*b*, 525-*c*, and 525-*d* may include a single bit including the indicator for the memory system to refrain from discharging the word lines 520 during the performance of the previously-initiated read operation. For example, the commands 525-*b*, 525-*c*, and 525-*d* may include a single bit that is set to a first logic value (e.g., a logic value '0', a logic value '1') that indicate for the memory system to refrain from discharging the word lines 520 during the performance of the preceding read operation. Additionally, the command 525-*a* may include a single bit set to a different, second logic value (e.g., a logic value '1', a logic value '0') indicating for the memory system to discharge the word lines 520 during the performance of a preceding read operation (e.g., not illustrated by the timing diagram 500).

Additionally, or alternatively, the commands 525 may include an indication of whether the consecutive read operations at the same block of multiple-level memory cells are on the same word line 520. For example, the commands 525 may include a single bit indicating whether the read operation indicated by the command 525 is on the same word line 520 as a preceding read operation. In the example of the timing diagram 500, the commands 525-*c* and 525-*d* may each include the single bit indicating that the read operations indicated by the commands 525-*c* and 525-*d* are on the same word line 520-*d* as the preceding read operations (e.g., the read operations indicated by the command 525-*b* and the command 525-*c*, respectively). Additionally, the commands 525-*a* and 525-*b* may include a single bit indicating that the read operations indicated by the commands 525-*a* and 525-*b* are not on the same word line 520 as the preceding read operations.

In the example of the timing diagram 500, the command 525-*a* may indicate a read operation in the block of multiple-level memory cells on the word line 520-*b*. The command 525-*a* may include a single bit indicating that the memory system should not refrain from discharging the word lines 520 during a performance of a preceding read operation (e.g., not illustrated by the timing diagram 500). Additionally, or alternatively, the command 525-*a* may include a first bit indicating that the read operation indicated by the command 525-*a* is not on a same word line 520 as a preceding read operation. In response to the command 525-*a*, the memory system may adjust the RDY signal 530 to a value indicating that the memory system is not currently able to initiate access operations at the block of memory cells and may adjust the ARDY signal 535 to a value indicating that the memory system is not currently able to initiate access operations at the array (e.g., including the block). Additionally, at time T0 the memory system may initiate the read operation by applying a voltage to the word lines 520 associated with the block (e.g., to open the block) during the activation phase 505-*a*. The memory system may then complete the first read operation by executing the precharge and sense operation 510-*a* from time T1 to time T3 and the recovery phase 515-*a* (e.g., to close the block) from time T3 to time T4. As part of the first read operation, the memory system may produce a data output (not illustrated), which may correspond to the data stored by the one or more memory cells in the block on the word line 520-*b*. After the memory system discharges the word lines 520 of the block (e.g., during the recovery phase 515-*a*) to close the block, the memory system may adjust the RDY signal 530 to a value indicating that the memory system is able to initiate access operations at the block.

The command 525-*b* may indicate the second read operation at the block on the word line 520-*d*. The command 525-*b* may include a single bit indicating that the memory system should refrain from discharging the word lines 520 during the performance of the preceding read operation (e.g., the first read operation initiated in response to the command 525-*a*). However, because the memory system receives the command 525-*b* after already beginning to discharge the word lines 520 of the block, the memory system may be unable to skip the recovery phase 515-*a* of the preceding read operation. That is, the memory system may not refrain from discharging the word lines 520 of the block during a performance of a preceding read operation at the block unless the memory system receives a command 525 indicating for the memory system to refrain from discharging the word lines 520 prior to initiating the recovery phase 515 of the preceding read operation. For example, in cases that the command 525-b had been received prior to the RDY signal 530 being set to the value indicating that the memory system is able to initiate access operations at the block (e.g., prior to time T3), the memory system have refrained from discharging the word lines 520 between the first and second read operations. However, because the command 525-b was received after the RDY signal 530 was set to the value indicating that the memory system is able to initiate access operations at the block, the memory system discharged the word lines 520 during the performance of the first read operation.

In response to receiving the command 525-b, the memory system may initiate the second read operation by opening the block during the activation phase 505-b from time T4 to time T5 and executing the precharge and sense operation 510-b from time T5 to time T6. Additionally, as part of the first read operation (e.g., in response to the command 525-a), the memory system may produce the data output 540-a, which may correspond to the data stored by the one or more memory cells in the block on the word line 520-d.

Prior to the completion of the precharge and sense operation 510-b associated with the second read operation (e.g., prior to time T7), the memory system may receive the command 525-c. The command 525-c may indicate the third read operation at the block on the word line 520-d. The command 525-c may include a single bit indicating that the memory system should refrain from discharging the word lines 520 during the performance of the preceding read operation (e.g., the second read operation initiated in response to the command 525-b). Because the memory system receives the command 525-c prior to beginning to discharge the word lines 520 of the block during the performance of the preceding second read operation, the memory system may be able to skip the recovery phase 515 of the preceding second read operation. Thus, the memory system may complete the execution of the second read operation after the precharge and sense operation 510-b and without executing a recovery phase (e.g., without discharging the word lines 520 and closing the block). For example, the memory system may refrain from closing and re-opening the block between the second and third read operations, thus decreasing a latency of the second and third read operations. That is, the memory system may not discharge and recharge the word lines 520 (e.g., by executing a recovery phase 515 and an activation phase 505) between the second and third read operations.

In some cases, the command 525-c may additionally include a single bit indicating that the third read operation is on the same word line 520-d as the preceding read operation. As a result, in response to receiving the command 525-c the memory system may initiate the third read operation (e.g., at time T7) without unselecting and reselecting the word line 520-d. The memory system may perform the third read operation by executing the precharge and sense operation 510-c. Additionally, as part of the second read operation, the memory system may produce the data output 540-b, which may correspond to the data stored by the one or more memory cells indicated by the command 525-b that are in the block and on the word line 520-d.

Prior to the completion of the precharge and sense operation 510-c associated with the third read operation (e.g., prior to time T9), the memory system may receive the command 525-d. The command 525-d may indicate the fourth read operation at the block and on the word line 520-d. The command 525-d may include a single bit indicating that the memory system should refrain from discharging the word lines 520 during the performance of the preceding read operation (e.g., the third read operation initiated in response to the command 525-c). Because the memory system receives the command 525-d prior to beginning to discharge the word lines 520 of the block during the performance of the preceding third read operation, the memory system may be able to skip the recovery phase 515 of the preceding third read operation. Thus, the memory system may complete the execution of the third read operation after the precharge and sense operation 510-c and without executing a recovery phase (e.g., without discharging the word lines 520 and closing the block). For example, the memory system may refrain from closing and re-opening the block between the third and fourth read operations, thus decreasing a latency of the third and fourth read operations. That is, the memory system may not discharge and recharge the word lines 520 (e.g., by executing a recovery phase 515 and an activation phase 505) between the second and third read operations.

In some cases, the command 525-d may additionally include a single bit indicating that the fourth read operation is on the same word line 520-d as the preceding read operation. As a result, in response to receiving the command 525-d the memory system may initiate the fourth read operation (e.g., at time T9) without unselecting and reselecting the word line 520-d. The memory system may perform the fourth read operation by executing the precharge and sense operation 510-d. As part of the third read operation, the memory system may produce the data output 540-c, which may correspond to the data stored by the one or more memory cells indicated by the command 525-c that are in the block and on the word line 520-d. To complete the performance of the fourth read operation, the memory system may execute a recovery phase 515-b to discharge the word lines 520 and close the block. Additionally, based on closing the block, the memory system may adjust the ARDY signal 535 to a value indicating that the memory system is able to initiate access operations within the array.

Figure 6:
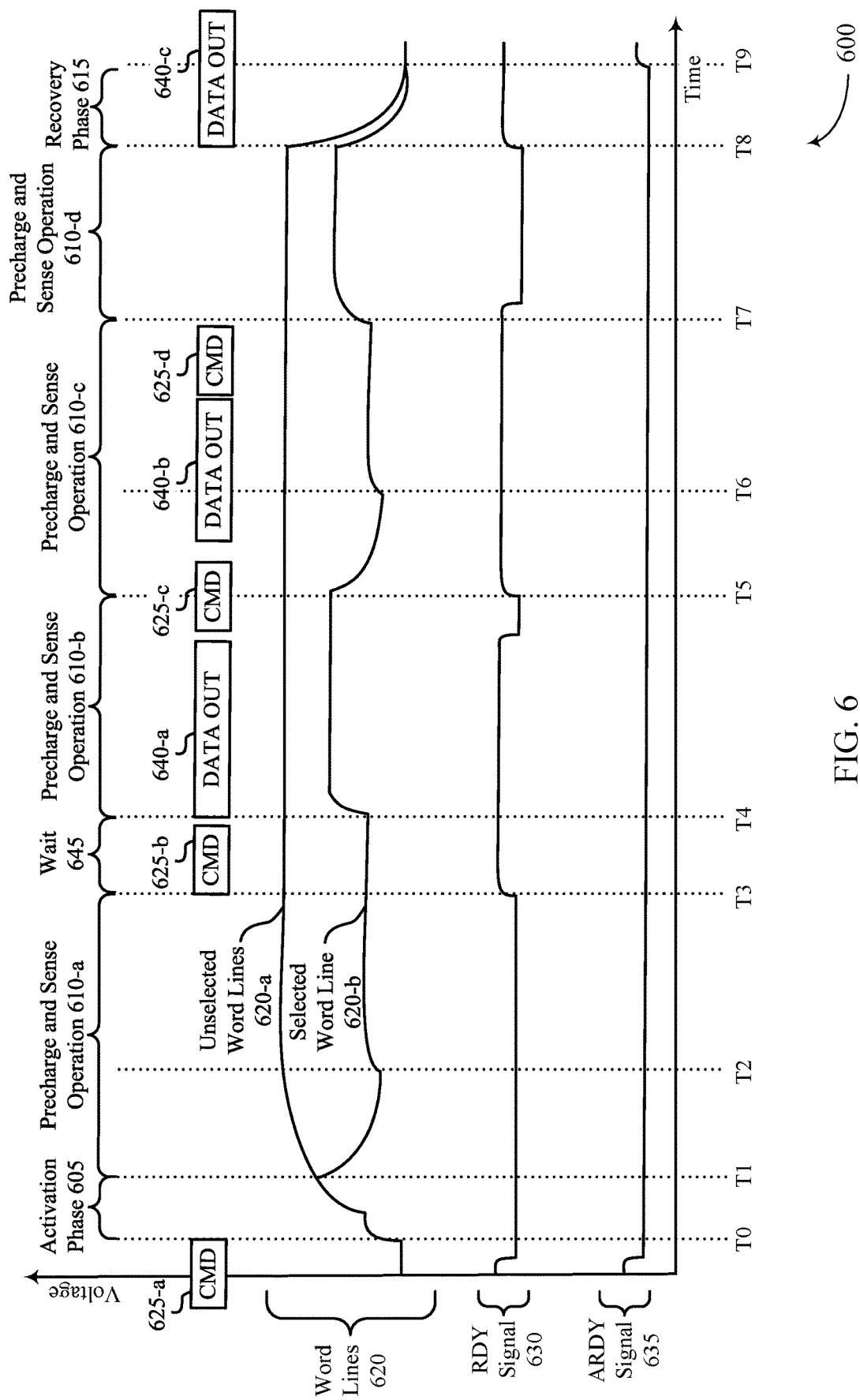

FIG. 6 illustrates an example of a timing diagram 600 that supports improved efficiency for consecutive read operations in accordance with examples as disclosed herein. The timing diagram 600 may illustrate the voltages across word lines 620, including the unselected word lines 620-a and the selected word line 620-b, during a read operation, which may be examples of word lines as described with reference to FIGS. 1 through 5. Additionally, the timing diagram 600 may illustrate the voltages of a logic unit ready (e.g., RDY) signal 630, the voltages of an array ready (e.g., ARDY) signal 635, selected word line 620, unselected word lines 620-a, and data outputs 640, which may be examples of the block ready signals, the array ready signals, the selected word lines, the unselected word lines, and data outputs 640 described with reference to FIGS. 3 through 5.

The timing diagram 600 may illustrate the various voltages and signals applied and output by a memory system during four consecutive read operations at a same block of memory cells as described herein. For example, the memory system may perform a first read operation from time T0 to time T3, a second read operation from time T4 to time T5, a third read operation from time T5 to time T7, and a fourth read operation from time T7 to time T9. The timing diagram 600 also includes an illustration of the four commands 625 indicating the first, second, third, and fourth read operations at the block of multiple-level memory cells. For example, the memory system may receive the command 625-*a* indicating the first read operation prior to time T0, the memory system may receive the command 625-*b* indicating the second read operation prior to time T4, the memory system may receive the command 625-*c* indicating the third read operation prior to time T5, and the memory system may receive the command 645-*d* indicating the fourth read operation prior to time T7.

In the example of the timing diagram 600, the commands 625-*b*, 625-*c*, and 625-*d* may each indicate consecutive or sequential read operations in the same block of multiple-level memory cells as the first command 625-*a*. Additionally, one or more of the commands 625-*a*, 625-*b*, and 625-*c* may indicate for the memory system to refrain from discharging the word lines 620 during the performance of the read operation indicated by the command 625. For example, one or more of the commands 625-*a*, 625-*b*, and 625-*c* may include a single bit that is set to a first logic value (e.g., a logic value '0', a logic value '1') that indicate for the memory system to refrain from discharging the word lines 620 during the performance of the corresponding read operation. Additionally, the command 625-*d* may include a single bit set to a different, second logic value (e.g., a logic value '1', a logic value '0) indicating for the memory system to discharge the word lines 620 during the performance of the fourth read operation. Additionally, the commands 625-*b*, 625-*c*, and 625-*d* may each indicate for the memory system to refrain from discharging the word lines 620 during the performance of a preceding read operation (e.g., the read operation initiated immediately prior to the read operation indicated by the command 625).

In a case that the memory system receives a first command 625 indicating for the memory system to refrain from discharging the word lines 620 during a performance of the corresponding first read operation and receives a second consecutive command 625 indicating for the memory system to refrain from discharging the word lines 620 during a performance of the preceding first read operation, the memory system may skip the recovery phase 615 and the activation phase 605 between the two read operations. For example, the command 625-*b* may include an indication for the memory system to refrain from discharging the word lines 620 during the performance of the second read operation. Additionally, the consecutively-received command 625-*c* may include an indication for the memory system to refrain from discharging the word lines 620 during the performance of the preceding second read operation. Thus, the memory system may not discharge and recharge the word lines 620 between the second and third read operations.

In another example, the command 625-*a* may include an indication to refrain from discharging the word lines 620 during the performance of the first read operation and the consecutively-received command 625-*b* may include an indication for the memory system to refrain from discharging the word lines 620 during the performance of the preceding first read operation. In this example, the memory system may finish an execution of the precharge and sense operation 610-*a* and refrain from discharging the word lines 620 (e.g., and closing the block). Because the memory system has not received another command 625 prior to the completion of the precharge and sense operation 610-*a* at time T3, the memory system may enter a wait period 645. During the wait period, the memory system may adjust the voltage of the RDY signal 630 to a value indicating that the memory system is able to initiate access operations in the block, but may refrain from discharging the word lines 620 associated with the block (e.g., in response to the command 625-*a* indicating for the memory system to refrain from discharging the word lines 620 during the performance of the first read operation). After the memory system receives the command 625-*b*, which includes an indication for the memory system to refrain from discharging the word lines 620 during the performance of the preceding, first read operation, the memory system may exit the wait period 645 and initiate the second read operation.

In a case that the memory system receives a first command 625 indicating for the memory system to refrain from discharging the word lines 620 during a performance of the corresponding first read operation and receives a second consecutive command 625 indicating for the memory system to discharge the word lines 620 during a performance of the preceding first read operation, the memory system may not skip the recovery phase 615 and the activation phase 605 between the two read operations. For example, in cases that the command 625-*b* indicates for the memory system to discharge the word lines 620 during the performance of the preceding first read operation, the memory system may end the wait period 645 by executing a recovery phase 615 (e.g., rather than initiating the performance of the second read operation without executing a recovery phase 615 and an activation phase 605).

In another case that the memory system receives a first command 625 indicating for the memory system to not refrain from discharging the word lines 620 during a performance of the corresponding first read operation and receives a second consecutive command 625 indicating for the memory system to refrain from discharging the word lines 620 during a performance of the preceding first read operation, the memory system may, in some instances, skip the recovery phase 615 and the activation phase 605 between the two read operations.

In one example, the command 625-*c* may not include an indication for the memory system to refrain from discharging the word lines 620 during the performance of the third read operation (e.g., the one bit in the command 625-*c* may indicate for one or more memory devices to discharge the word lines 620 during a performance of the corresponding read operation). Additionally, the consecutively-received command 625-*d* may be received prior to the completion of the precharge and sense operation 610-*c* and may include an indication for the memory system to refrain from discharging the word lines 620 during the performance of the preceding third read operation. Here, even though the command 625-*c* does not include an indication for the memory system to refrain from discharging the word lines 620 during a performance of the third read operation, because the command 625-*d* is received before the completion of the precharge and sense operation 610-*c* (e.g., and prior to a beginning of a recovery phase 615 of the third read operation) and includes the indication to refrain from discharging the word lines 620 during the performance of the preceding third read operation, the memory system may not discharge the word lines 620 between the third and fourth read operations.

In another example, a first command 625 may not include an indication for the memory system to refrain from discharging the word lines 620 during the performance of a corresponding first read operation (e.g., the one bit in the command 625 may indicate for the one or more memory devices to discharge the word lines 620 during a performance of the corresponding first read operation). Additionally, a consecutively-received second command 625 may be received after the completion of the precharge and sense operation 610 associated with the first read operation and may include an indication for the memory system to refrain from discharging the word lines 620 during the performance of the preceding first read operation. Here, because the second command 625 does not include an indication for the memory system to refrain from discharging the word lines 620 during a performance of the first read operation, the memory system may execute a recovery phase 615 after the precharge and sense operation 610 (e.g., rather than entering a wait period 645). Thus, even though the second command 625 does include an indication for the memory system to refrain from discharging the word lines 620 during the performance of the first read operation, the memory system may still execute a recovery phase 615 and an activation phase 605 between the first and second read operations (e.g., since the second command 625 is received after an execution of the recovery phase 615 of the first read operation has already begun).

After a completion of the read operations at the block in response to each of the four commands 625, the memory system may close the block (e.g., during the recovery phase 615) and adjust the ARDY signal 635 to the value indicating that the array is ready to initiate access operations at the array.

Figure 7:
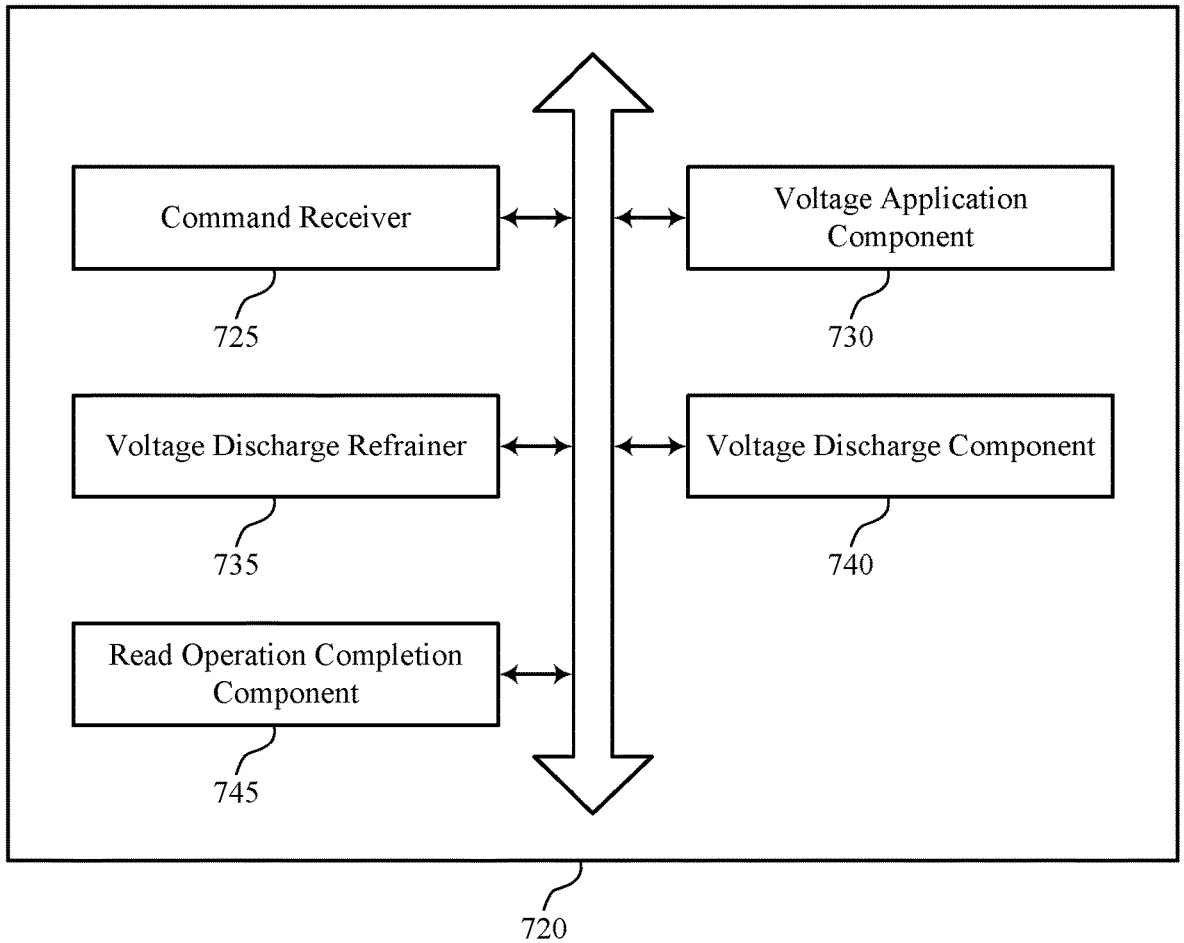
FIG. 7 illustrates a block diagram of a memory system that supports improved efficiency for consecutive read operations in accordance with examples as disclosed herein.

FIG. 7 illustrates a block diagram 700 of a memory system 720 that supports improved efficiency for consecutive read operations in accordance with examples as disclosed herein. The memory system 720 may be an example of aspects of a memory system as described with reference to FIGS. 1 through 6. The memory system 720, or various components thereof, may be an example of means for performing various aspects of improved efficiency for consecutive read operations as described herein. For example, the memory system 720 may include a command receiver 725, a voltage application component 730, a voltage discharge refrainer 735, a voltage discharge component 740, a read operation completion component 745, or any combination thereof. Each of these components may communicate, directly or indirectly, with one another (e.g., via one or more buses).

The command receiver 725 may be configured as or otherwise support a means for receiving a first command indicating a first read operation in a block of memory cells, where each memory cell of the block of memory cells is configured to store more than one bit. The voltage application component 730 may be configured as or otherwise support a means for applying, based at least in part on receiving the first command, a voltage to a plurality of access lines associated with the block of memory cells to initiate a performance of the first read operation. In some examples, the command receiver 725 may be configured as or otherwise support a means for receiving, after receiving the first command, a second command indicating a second read operation in the block of memory cells, the second command including an indication to refrain from discharging the plurality of access lines. The voltage discharge refrainer 735 may be configured as or otherwise support a means for initiating, based at least in part on receiving the second command, the performance of the second read operation without discharging the plurality of access lines based at least in part on the second command including the indication to refrain from discharging the plurality of access lines.

In some examples, the first command includes a second indication to refrain from discharging the plurality of access lines during the performance of the first read operation. In some examples, initiating the performance of the second read operation without discharging the plurality of access lines is based at least in part on the first command including the second indication.

In some examples, the read operation completion component 745 may be configured as or otherwise support a means for completing the first read operation based at least in part on applying the voltage to the plurality of access lines. In some examples, the voltage discharge refrainer 735 may be configured as or otherwise support a means for refraining from discharging the plurality of access lines after completing the first read operation based at least in part on the indication, where receiving the second command occurs while refraining from discharging the plurality of access lines after completing the first read operation.

In some examples, the second command is received prior to a completion of the first read operation. In some examples, refraining from discharging the plurality of access lines is based at least in part on receiving the second command including the indication prior to the completion of the first read operation.

In some examples, the second command further includes a second indication to refrain from discharging the plurality of access lines during the performance of the second read operation, and the command receiver 725 may be configured as or otherwise support a means for receiving, after receiving the second command, a third command indicating a third read operation and failing to include a third indication to refrain from discharging the plurality of access lines during the performance of the second read operation prior to initiating a performance of the third read operation. In some examples, the second command further includes a second indication to refrain from discharging the plurality of access lines during the performance of the second read operation, and the voltage discharge component 740 may be configured as or otherwise support a means for discharging the plurality of access lines prior to initiating the performance of the third read operation based at least in part on the third command failing to include the second indication.

In some examples, the command receiver 725 may be configured as or otherwise support a means for receiving, after completing the second read operation, a third command indicating a third read operation in the block of memory cells, the third command including a second indication to refrain from discharging the plurality of access lines during the performance of the second read operation prior to initiating a performance of the third read operation. In some examples, the voltage discharge component 740 may be configured as or otherwise support a means for discharging the plurality of access lines prior to initiating the performance of the third read operation based at least in part on receiving the third command after completing the second read operation.

In some examples, the first read operation and the second read operation are associated with a first access line of the plurality of access lines. In some examples, initiating the performance of the first read operation includes selecting the first access line. In some examples, initiating the performance of the second read operation includes maintaining a selection of the first access line.

In some examples, the first read operation is associated with a first access line of the plurality of access lines. In some examples, the second read operation is associated with a second access line of the plurality of access lines, the second access line different than the first access line. In some examples, initiating the performance of the first read operation includes selecting the first access line. In some examples, initiating the performance of the second read operation includes deselecting the first access line and selecting the second access line.

In some examples, a single bit in the second command includes the indication to refrain from discharging the plurality of access lines.

Figure 8:
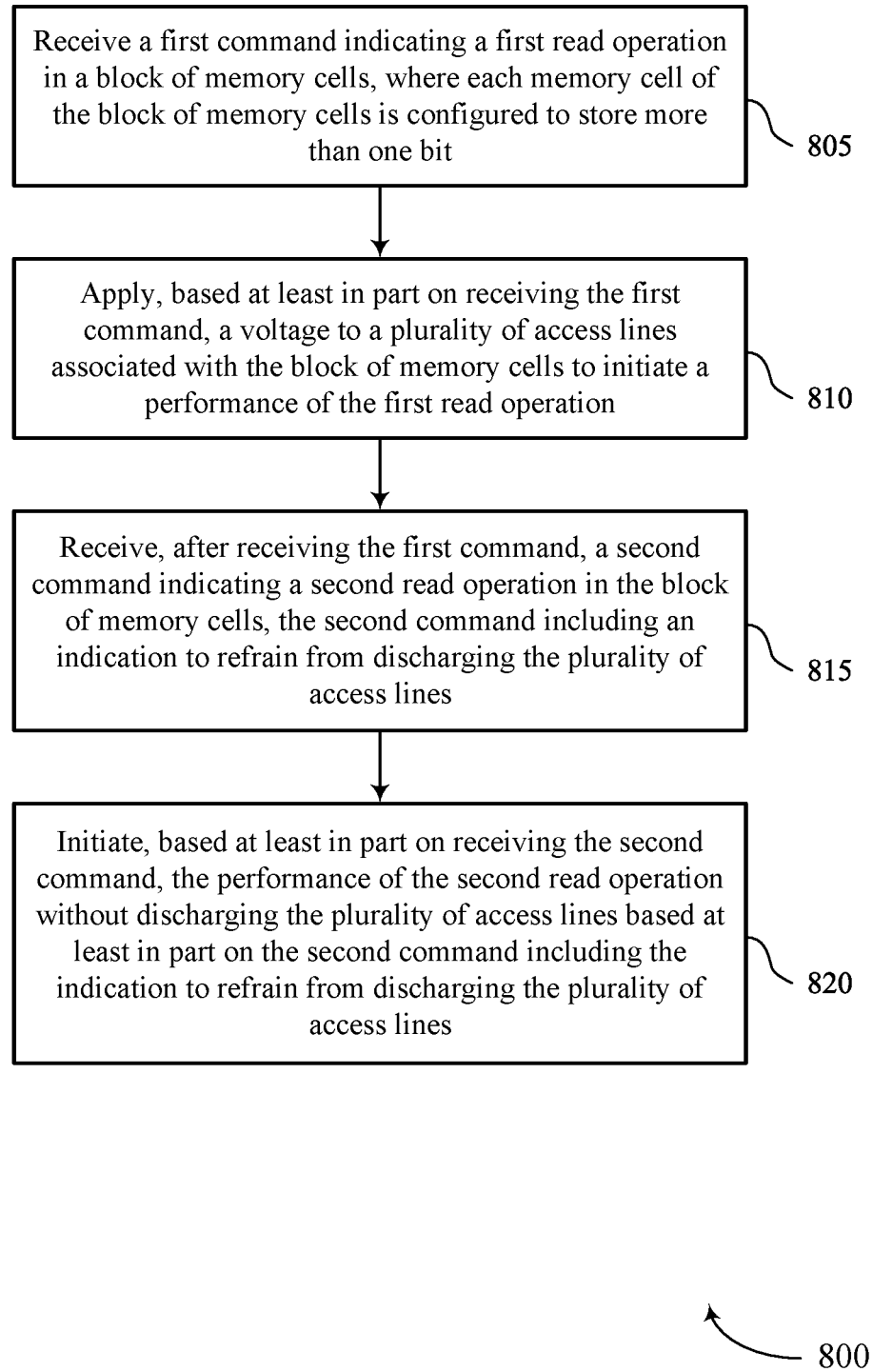
FIG. 8 illustrates a flowchart showing a method or methods that support improved efficiency for consecutive read operations in accordance with examples as disclosed herein.

FIG. 8 illustrates a flowchart showing a method 800 that supports improved efficiency for consecutive read operations in accordance with examples as disclosed herein. The operations of method 800 may be implemented by a memory system or its components as described herein. For example, the operations of method 800 may be performed by a memory system as described with reference to FIGS. 1 through 7. In some examples, a memory system may execute a set of instructions to control the functional elements of the device to perform the described functions. Additionally, or alternatively, the memory system may perform aspects of the described functions using special-purpose hardware.

At 805, the method may include receiving a first command indicating a first read operation in a block of memory cells, where each memory cell of the block of memory cells is configured to store more than one bit. The operations of 805 may be performed in accordance with examples as disclosed herein. In some examples, aspects of the operations of 805 may be performed by a command receiver 725 as described with reference to FIG. 7.

At 810, the method may include applying, based at least in part on receiving the first command, a voltage to a plurality of access lines associated with the block of memory cells to initiate a performance of the first read operation. The operations of 810 may be performed in accordance with examples as disclosed herein. In some examples, aspects of the operations of 810 may be performed by a voltage application component 730 as described with reference to FIG. 7.

At 815, the method may include receiving, after receiving the first command, a second command indicating a second read operation in the block of memory cells, the second command including an indication to refrain from discharging the plurality of access lines. The operations of 815 may be performed in accordance with examples as disclosed herein. In some examples, aspects of the operations of 815 may be performed by a command receiver 725 as described with reference to FIG. 7.

At 820, the method may include initiating, based at least in part on receiving the second command, the performance of the second read operation without discharging the plurality of access lines based at least in part on the second command including the indication to refrain from discharging the plurality of access lines. The operations of 820 may be performed in accordance with examples as disclosed herein. In some examples, aspects of the operations of 820 may be performed by a voltage discharge refrainer 735 as described with reference to FIG. 7.

In some examples, an apparatus as described herein may perform a method or methods, such as the method 800. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving a first command indicating a first read operation in a block of memory cells, where each memory cell of the block of memory cells is configured to store more than one bit; applying, based at least in part on receiving the first command, a voltage to a plurality of access lines associated with the block of memory cells to initiate a performance of the first read operation; receiving, after receiving the first command, a second command indicating a second read operation in the block of memory cells, the second command including an indication to refrain from discharging the plurality of access lines; and initiating, based at least in part on receiving the second command, the performance of the second read operation without discharging the plurality of access lines based at least in part on the second command including the indication to refrain from discharging the plurality of access lines.

Aspect 2: The method, apparatus, or non-transitory computer-readable medium of aspect 1, where the first command includes a second indication to refrain from discharging the plurality of access lines during the performance of the first read operation and initiating the performance of the second read operation without discharging the plurality of access lines is based at least in part on the first command including the second indication.

Aspect 3: The method, apparatus, or non-transitory computer-readable medium of aspect 2, further including operations, features, circuitry, logic, means, or instructions, or any combination thereof for completing the first read operation based at least in part on applying the voltage to the plurality of access lines and refraining from discharging the plurality of access lines after completing the first read operation based at least in part on the indication, where receiving the second command occurs while refraining from discharging the plurality of access lines after completing the first read operation.

Aspect 4: The method, apparatus, or non-transitory computer-readable medium of any of aspects 1 through 3, where the second command is received prior to a completion of the first read operation and refraining from discharging the plurality of access lines is based at least in part on receiving the second command including the indication prior to the completion of the first read operation.

Aspect 5: The method, apparatus, or non-transitory computer-readable medium of any of aspects 1 through 4, where the second command further includes a second indication to refrain from discharging the plurality of access lines during the performance of the second read operation and the method, apparatuses, and non-transitory computer-readable medium further includes operations, features, circuitry, logic, means, or instructions, or any combination thereof for receiving, after receiving the second command, a third command indicating a third read operation and failing to include a third indication to refrain from discharging the plurality of access lines during the performance of the second read operation prior to initiating a performance of the third read operation and discharging the plurality of access lines prior to initiating the performance of the third read operation based at least in part on the third command failing to include the second indication.

Aspect 6: The method, apparatus, or non-transitory computer-readable medium of any of aspects 1 through 5, further including operations, features, circuitry, logic, means, or instructions, or any combination thereof for receiving, after completing the second read operation, a third command indicating a third read operation in the block of memory cells, the third command including a second indication to refrain from discharging the plurality of access lines during the performance of the second read operation prior to initiating a performance of the third read operation and discharging the plurality of access lines prior to initiating the performance of the third read operation based at least in part on receiving the third command after completing the second read operation.

Aspect 7: The method, apparatus, or non-transitory computer-readable medium of any of aspects 1 through 6, where the first read operation and the second read operation are associated with a first access line of the plurality of access lines; initiating the performance of the first read operation includes selecting the first access line; and initiating the performance of the second read operation includes maintaining a selection of the first access line.

Aspect 8: The method, apparatus, or non-transitory computer-readable medium of any of aspects 1 through 7, where the first read operation is associated with a first access line of the plurality of access lines; the second read operation is associated with a second access line of the plurality of access lines, the second access line different than the first access line; initiating the performance of the first read operation includes selecting the first access line; and initiating the performance of the second read operation includes deselecting the first access line and selecting the second access line.

Aspect 9: The method, apparatus, or non-transitory computer-readable medium of any of aspects 1 through 8, where a single bit in the second command includes the indication to refrain from discharging the plurality of access lines.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
one or more memory devices; and
one or more controllers coupled with the one or more memory devices and configured to cause the apparatus to:
receive a first command indicating a first read operation in a block of memory cells, wherein each memory cell of the block of memory cells is configured to store more than one bit;
apply, based at least in part on receiving the first command, a voltage to a plurality of access lines associated with the block of memory cells to initiate a performance of the first read operation;
receive, after receiving the first command, a second command indicating a second read operation in the block of memory cells, the second command comprising a first indication to refrain from discharging the plurality of access lines, wherein a single bit in the second command comprises the first indication to refrain from discharging the plurality of access lines; and
initiate, based at least in part on receiving the second command, the performance of the second read operation without discharging the plurality of access lines based at least in part on the second command comprising the first indication to refrain from discharging the plurality of access lines.

2. The apparatus of claim 1, wherein:
the first command comprises a second indication to refrain from discharging the plurality of access lines during the performance of the first read operation; and
initiating the performance of the second read operation without discharging the plurality of access lines is based at least in part on the first command comprising the second indication.

3. The apparatus of claim 2, wherein the one or more controllers are further configured to cause the apparatus to:
complete the first read operation based at least in part on applying the voltage to the plurality of access lines; and
refrain from discharging the plurality of access lines after completing the first read operation based at least in part on the second indication, wherein receiving the second command occurs while refraining from discharging the plurality of access lines after completing the first read operation.

4. The apparatus of claim 1, wherein:
the second command is received prior to a completion of the first read operation; and
refraining from discharging the plurality of access lines is based at least in part on receiving the second command comprising the first indication prior to the completion of the first read operation.

5. The apparatus of claim 1, wherein:
the second command further comprises a second indication to refrain from discharging the plurality of access lines during the performance of the second read operation; and
the one or more controllers are further configured to cause the apparatus to:
receive, after receiving the second command, a third command indicating a third read operation and failing to comprise a third indication to refrain from discharging the plurality of access lines during the performance of the second read operation prior to initiating a performance of the third read operation, and
discharge the plurality of access lines prior to initiating the performance of the third read operation based at least in part on the third command failing to comprise the third indication.

6. The apparatus of claim 1, wherein the one or more controllers are further configured to cause the apparatus to:
receive, after completing the second read operation, a third command indicating a third read operation in the block of memory cells, the third command comprising a second indication to refrain from discharging the plurality of access lines during the performance of the second read operation prior to initiating a performance of the third read operation; and
discharge the plurality of access lines prior to initiating the performance of the third read operation based at least in part on receiving the third command after completing the second read operation.

7. The apparatus of claim 1, wherein:
the first read operation and the second read operation are associated with a first access line of the plurality of access lines;
initiating the performance of the first read operation comprises selecting the first access line; and
initiating the performance of the second read operation comprises maintaining a selection of the first access line.

8. The apparatus of claim 1, wherein:
the first read operation is associated with a first access line of the plurality of access lines;
the second read operation is associated with a second access line of the plurality of access lines, the second access line different than the first access line;
initiating the performance of the first read operation comprises selecting the first access line; and
initiating the performance of the second read operation comprises deselecting the first access line and selecting the second access line.

9. The apparatus of claim 1, wherein refraining from discharging the plurality of access lines is based at least in part on the first read operation and the second read operation being sequential read operations.

10. A non-transitory computer-readable medium storing code comprising instructions which, when executed by a processor of an electronic device, cause the electronic device to:
receive a first command indicating a first read operation in a block of memory cells, wherein each memory cell of the block of memory cells is configured to store more than one bit;
apply, based at least in part on receiving the first command, a voltage to a plurality of access lines associated with the block of memory cells to initiate a performance of the first read operation;
receive, after receiving the first command, a second command indicating a second read operation in the block of memory cells, the second command comprising a first indication to refrain from discharging the plurality of access lines, wherein a single bit in the second command comprises the first indication to refrain from discharging the plurality of access lines; and
initiate, based at least in part on receiving the second command, the performance of the second read operation without discharging the plurality of access lines based at least in part on the second command comprising the first indication to refrain from discharging the plurality of access lines.

11. The non-transitory computer-readable medium of claim 10, wherein:
the first command comprises a second indication to refrain from discharging the plurality of access lines during the performance of the first read operation; and
initiating the performance of the second read operation without discharging the plurality of access lines is based at least in part on the first command comprising the second indication.

12. The non-transitory computer-readable medium of claim 11, wherein the instructions, when executed by the processor of the electronic device, further cause the electronic device to:
complete the first read operation based at least in part on applying the voltage to the plurality of access lines; and
refrain from discharging the plurality of access lines after completing the first read operation based at least in part on the second indication, wherein receiving the second command occurs while refraining from discharging the plurality of access lines after completing the first read operation.

13. The non-transitory computer-readable medium of claim 10, wherein:
the second command is received prior to a completion of the first read operation; and
refraining from discharging the plurality of access lines is based at least in part on receiving the second command comprising the first indication prior to the completion of the first read operation.

14. The non-transitory computer-readable medium of claim 10, wherein:
the second command further comprises a second indication to refrain from discharging the plurality of access lines during the performance of the second read operation; and
the instructions, when executed by the processor of the electronic device, further cause the electronic device to:
receive, after receiving the second command, a third command indicating a third read operation and failing to comprise a third indication to refrain from discharging the plurality of access lines during the performance of the second read operation prior to initiating a performance of the third read operation, and
discharge the plurality of access lines prior to initiating the performance of the third read operation based at least in part on the third command failing to comprise the third indication.

15. The non-transitory computer-readable medium of claim 10, wherein the instructions, when executed by the processor of the electronic device, further cause the electronic device to:
receive, after completing the second read operation, a third command indicating a third read operation in the block of memory cells, the third command comprising a second indication to refrain from discharging the plurality of access lines during the performance of the second read operation prior to initiating a performance of the third read operation; and
discharge the plurality of access lines prior to initiating the performance of the third read operation based at least in part on receiving the third command after completing the second read operation.

16. The non-transitory computer-readable medium of claim 10, wherein:
the first read operation and the second read operation are associated with a first access line of the plurality of access lines;
initiating the performance of the first read operation comprises selecting the first access line; and
initiating the performance of the second read operation comprises maintaining a selection of the first access line.

17. The non-transitory computer-readable medium of claim 10, wherein:
the first read operation is associated with a first access line of the plurality of access lines;
the second read operation is associated with a second access line of the plurality of access lines, the second access line different than the first access line;
initiating the performance of the first read operation comprises selecting the first access line; and
initiating the performance of the second read operation comprises deselecting the first access line and selecting the second access line.

18. A method, comprising:
receiving a first command indicating a first read operation in a block of memory cells, wherein each memory cell of the block of memory cells is configured to store more than one bit;
applying, based at least in part on receiving the first command, a voltage to a plurality of access lines associated with the block of memory cells to initiate a performance of the first read operation;

receiving, after receiving the first command, a second command indicating a second read operation in the block of memory cells, the second command comprising a first indication to refrain from discharging the plurality of access lines, wherein a single bit in the second command comprises the first indication to refrain from discharging the plurality of access lines; and initiating, based at least in part on receiving the second command, the performance of the second read operation without discharging the plurality of access lines based at least in part on the second command comprising the first indication to refrain from discharging the plurality of access lines.

* * * * *